United States Patent
Smith et al.

(10) Patent No.: US 11,950,547 B2
(45) Date of Patent: Apr. 9, 2024

(54) APPARATUS FOR GROW TOWER WEIGHT MEASUREMENT

(71) Applicant: MJNN LLC, South San Francisco, CA (US)

(72) Inventors: Damon Smith, Laramie, WY (US); Kevin Grauberger, Laramie, WY (US); Aunders Hallsten, Cheyenne, WY (US); Gage Coffin, Los Altos Hills, CA (US)

(73) Assignee: MJNN LLC, South San Francisco, CA (US)

( * ) Notice: Subject to any disclaimer, the term of this patent is extended or adjusted under 35 U.S.C. 154(b) by 130 days.

(21) Appl. No.: 17/327,479

(22) Filed: May 21, 2021

(65) Prior Publication Data

US 2021/0360889 A1 Nov. 25, 2021

Related U.S. Application Data

(60) Provisional application No. 63/028,960, filed on May 22, 2020.

(51) Int. Cl.
*A01G 31/06* (2006.01)
*G01G 19/18* (2006.01)

(52) U.S. Cl.
CPC .......... *A01G 31/06* (2013.01); *G01G 19/18* (2013.01)

(58) Field of Classification Search
CPC ...... A01G 9/024; A01G 31/06; A01G 31/042; B65G 17/20; G01G 19/14; G01G 19/18; G01G 19/52; G01G 21/14; G01G 21/16
See application file for complete search history.

(56) References Cited

U.S. PATENT DOCUMENTS

| | | | |
|---|---|---|---|
| 3,894,592 A * | 7/1975 | Andersson | G01G 3/1408 177/163 |
| 9,658,098 B2 * | 5/2017 | Peters | A22B 5/00 |
| 10,121,121 B1 * | 11/2018 | De Bonet | A47B 57/34 |
| 11,352,212 B2 * | 6/2022 | Wend | B65G 47/28 |
| 11,446,193 B2 * | 9/2022 | Kaikenger | A61G 7/1017 |
| 11,579,010 B1 * | 2/2023 | Herrmann | G01G 19/18 |
| 2011/0186405 A1 * | 8/2011 | Blanc | B65G 47/61 198/867.02 |
| 2017/0142912 A1 * | 5/2017 | Gasmer | A01G 9/0293 |
| 2021/0227755 A1 * | 7/2021 | Moffitt | A01G 9/023 |

FOREIGN PATENT DOCUMENTS

KR 100660208 B1 * 12/2006

* cited by examiner

*Primary Examiner* — Magdalena Topolski
*Assistant Examiner* — Katherine Anne Kloecker
(74) *Attorney, Agent, or Firm* — Brooks D. Tueting

(57) ABSTRACT

Embodiments of the present disclosure provide for weight measurement of grow towers and/or grow lines with grow towers disposed thereon. In various embodiments, compression type, tension type, and/or beam type load cells may be positioned at various locations within the apparatus to facilitate weight measurement. In one embodiment, a hook, which couples a grow tower to a grow line, includes a tension type load cell disposed between two portions of the hook. The load cell measures force applied thereto which can provide or be translated into a weight measurement.

8 Claims, 11 Drawing Sheets

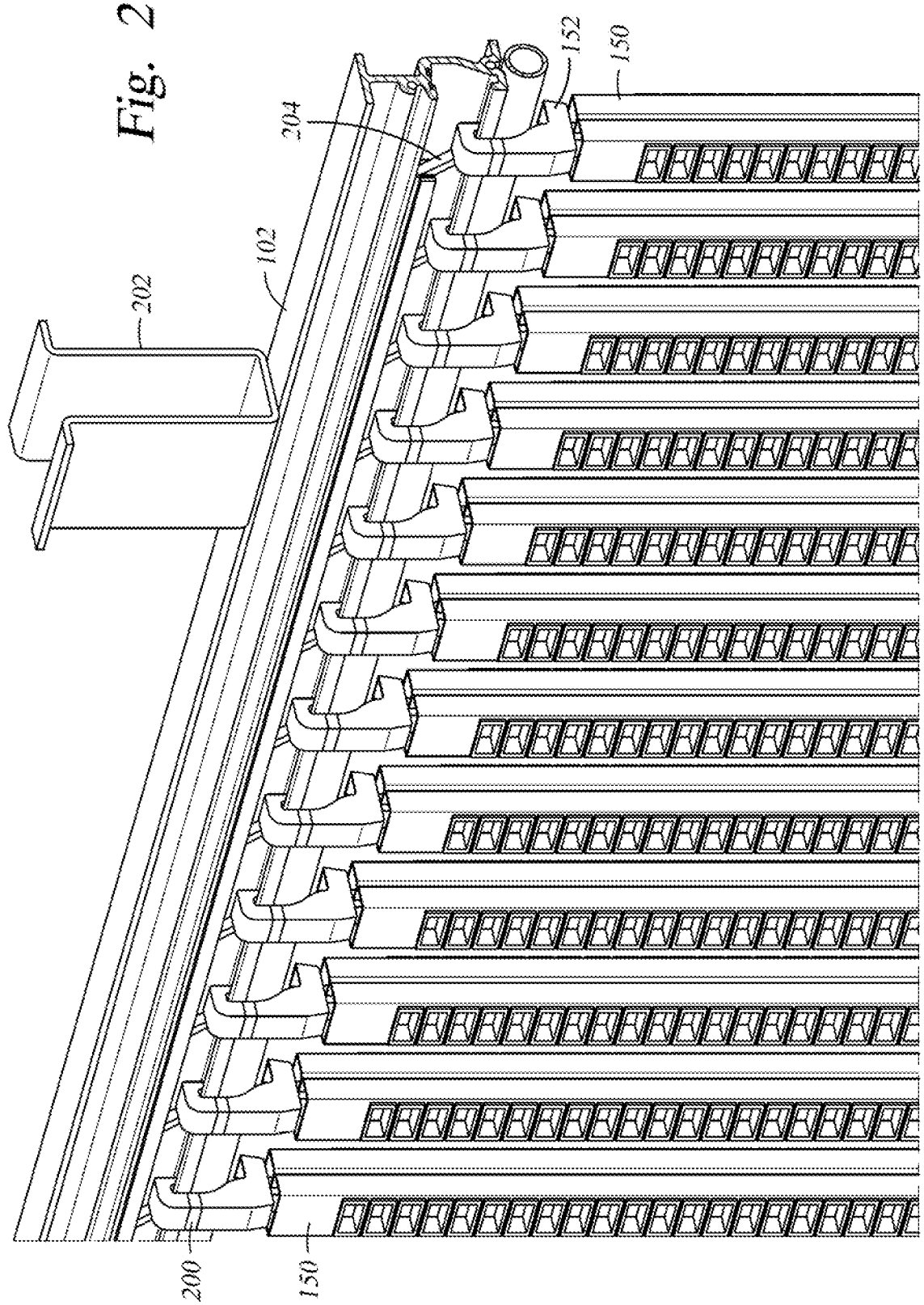

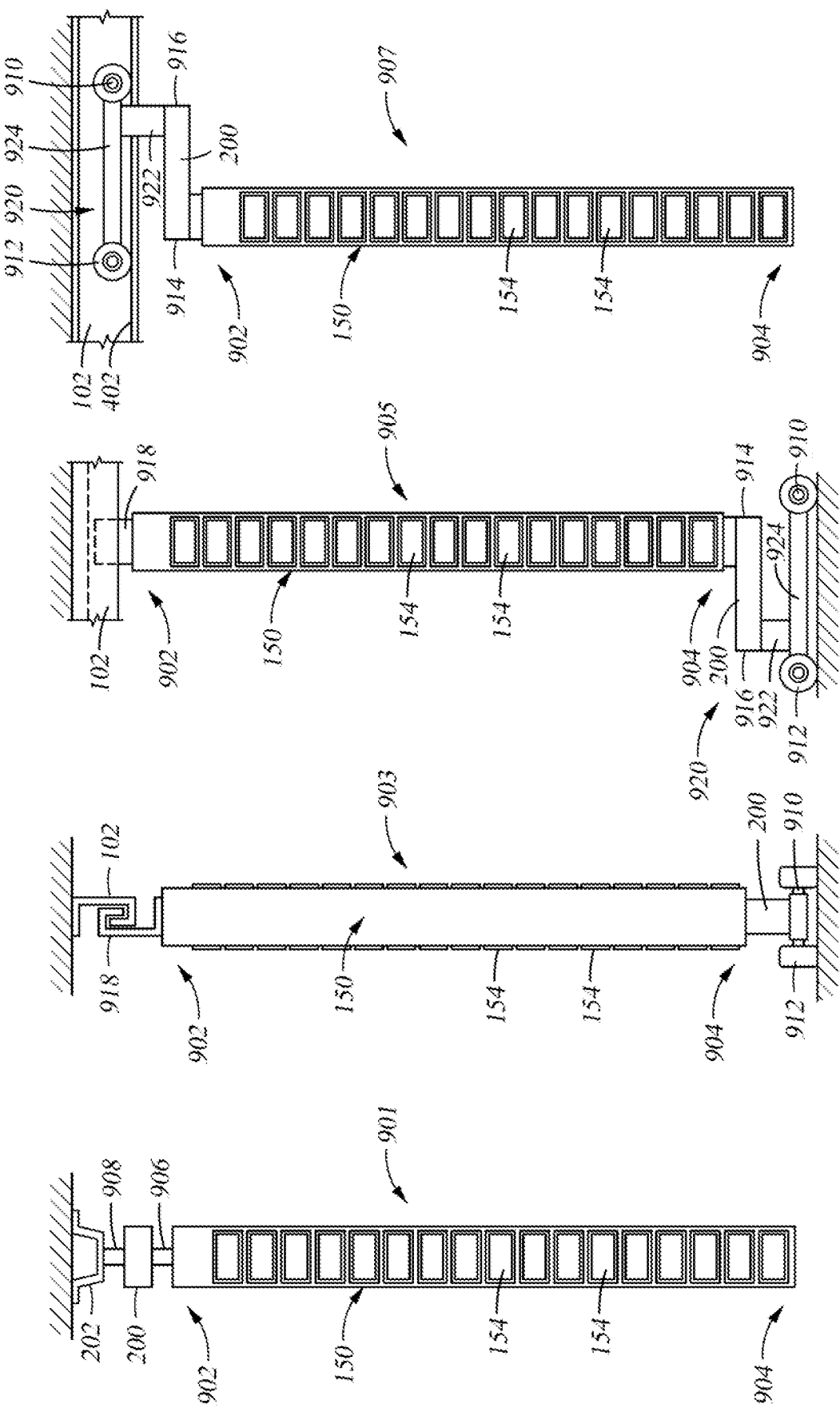

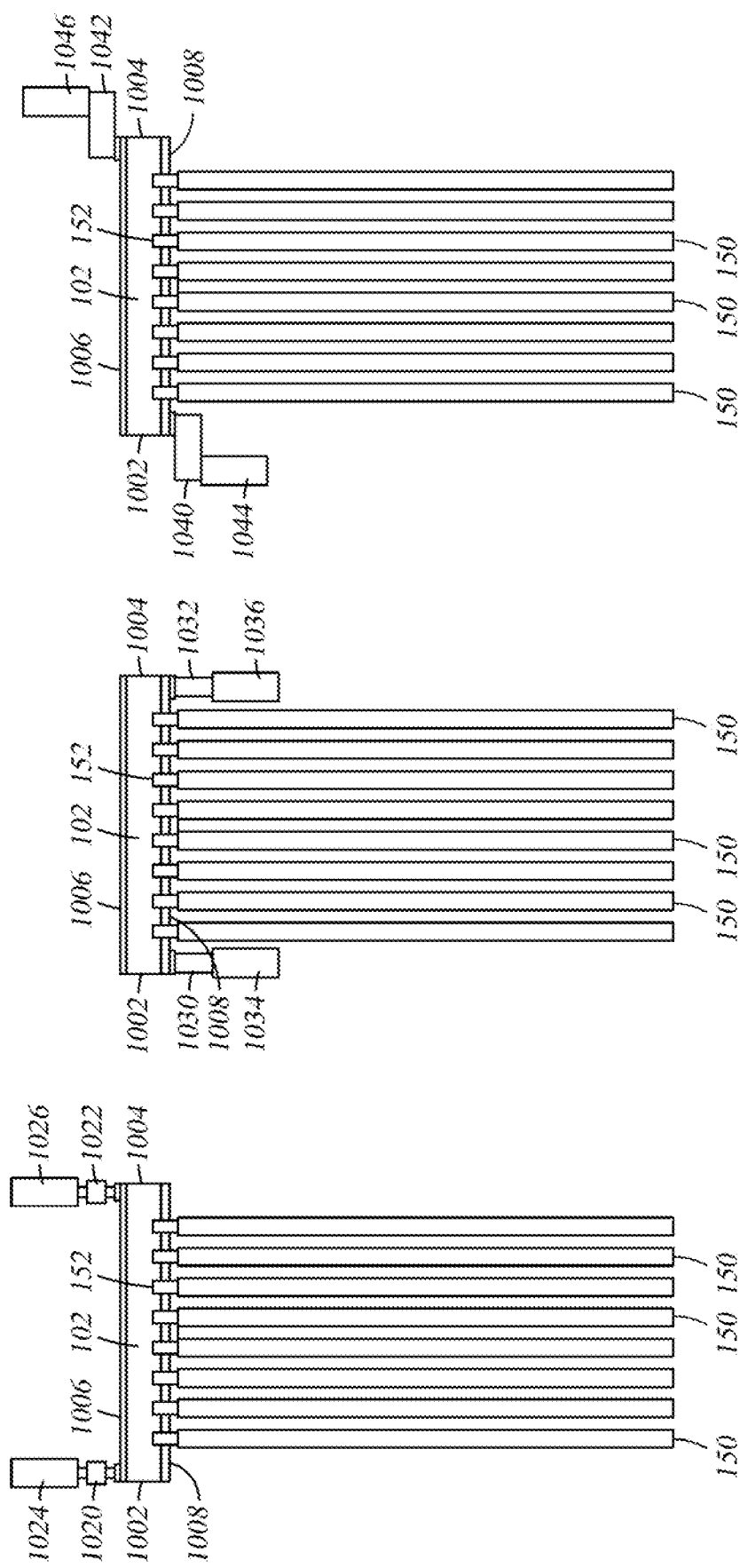

APPARATUS FOR GROW TOWER WEIGHT MEASUREMENT

CROSS-REFERENCE TO RELATED APPLICATIONS

This application claims priority to U.S. Provisional Patent Application No. 63/028,960, filed May 22, 2020, the entirety of which is herein incorporated by reference.

BACKGROUND

Field

Embodiments of the present disclosure generally relate to indoor agriculture systems. More specifically, embodiments of the present disclosure relate to metrology systems for grow tower weight measurement.

Description of the Related Art

Conventional agricultural practices have evolved rapidly over the twentieth century to what can now be considered a fast-moving high-tech industry. Global food shortages, climate change, a societal changes instigated a transition from manually implemented agriculture techniques toward advanced farming methods, such as mechanized and automated farming. While conventional agricultural practices often limit a farmer to one growing season, indoor farming can eliminate environmental constraints and increase crop production. Controlled environment agriculture, or indoor farming, often implements data processing technologies and many advances, such as crop yield and the like, can be gained by utilizing such technologies.

However, commercial scale controlled environment agriculture is still in its relative infancy when compared to conventional agricultural practices. Although there exists great potential for data collection and analysis of various aspects of controlled environment agriculture, such technologies are not well developed. For example, the ability to efficiently and accurately measure crop yields remains difficult even within controlled environment agriculture systems.

Accordingly, what is needed in the art are improved metrology apparatus and processes for controlled environment agriculture systems.

SUMMARY

In one embodiment, a hook for a grow tower apparatus is provided. The apparatus includes a first hook portion having a groove engaging member extending from the first hook portion, a second hook portion having a flange extending from the second hook portion, and a load cell coupled between the first hook portion and the second hook portion. The load cell includes a first arm coupled to the first hook portion by a first bracket and a second arm coupled to the second hook portion by a second bracket.

In another embodiment, a hook for a grow tower apparatus is provided. The apparatus includes a body having a flange extending therefrom, a first extension of the body extending opposite the flange, a second extension of the body extending laterally from the first extension of the body, a top extending in a direction substantially normal to the second extension of the body, a load cell coupled to the tip, and a groove engaging member coupled to the load cell.

In another embodiment, a grow line apparatus is provided. The apparatus includes a body having a first arm extending along a centerline of the body, a second arm of the body extending opposite the first arm, a base member extending laterally from the second arm and across the centerline of the body, and a lip extending from the base member toward the first arm. The lip, the base member, and the second arm define a groove and a load cell is disposed in the groove.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 2 illustrates a perspective view of a portion of a grow line with grow towers according to an embodiment of the disclosure.

FIG. 9A illustrates a side view of a grow tower weight measurement system according to an embodiment of the disclosure.

FIG. 9B illustrates an end side view of a grow tower weight measurement system according to an embodiment of the disclosure.

FIG. 9C illustrates a side view of a grow tower weight measurement system according to an embodiment of the disclosure.

FIG. 9D illustrates a side view of a grow tower weight measurement system according to an embodiment of the disclosure.

FIG. 10A illustrates a side view of a grow line weight measurement system according to an embodiment of the disclosure.

FIG. 10B illustrates a side view of a grow line weight measurement system according to an embodiment of the disclosure.

FIG. 10C illustrates a side view of a grow line weight measurement system according to an embodiment of the disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure provide for weight measurement of grow towers and/or grow lines with grow towers disposed thereon. In various embodiments, compression type, tension type, and/or beam type load cells are be positioned at various locations within the apparatus to facilitate weight measurement. In one embodiment, a hook, which couples a grow tower to a grow line, includes a tension type load cell disposed between two portions of the hook. The load cell measures force applied thereto which can provide or be translated into a weight measurement.

Figure 1A:
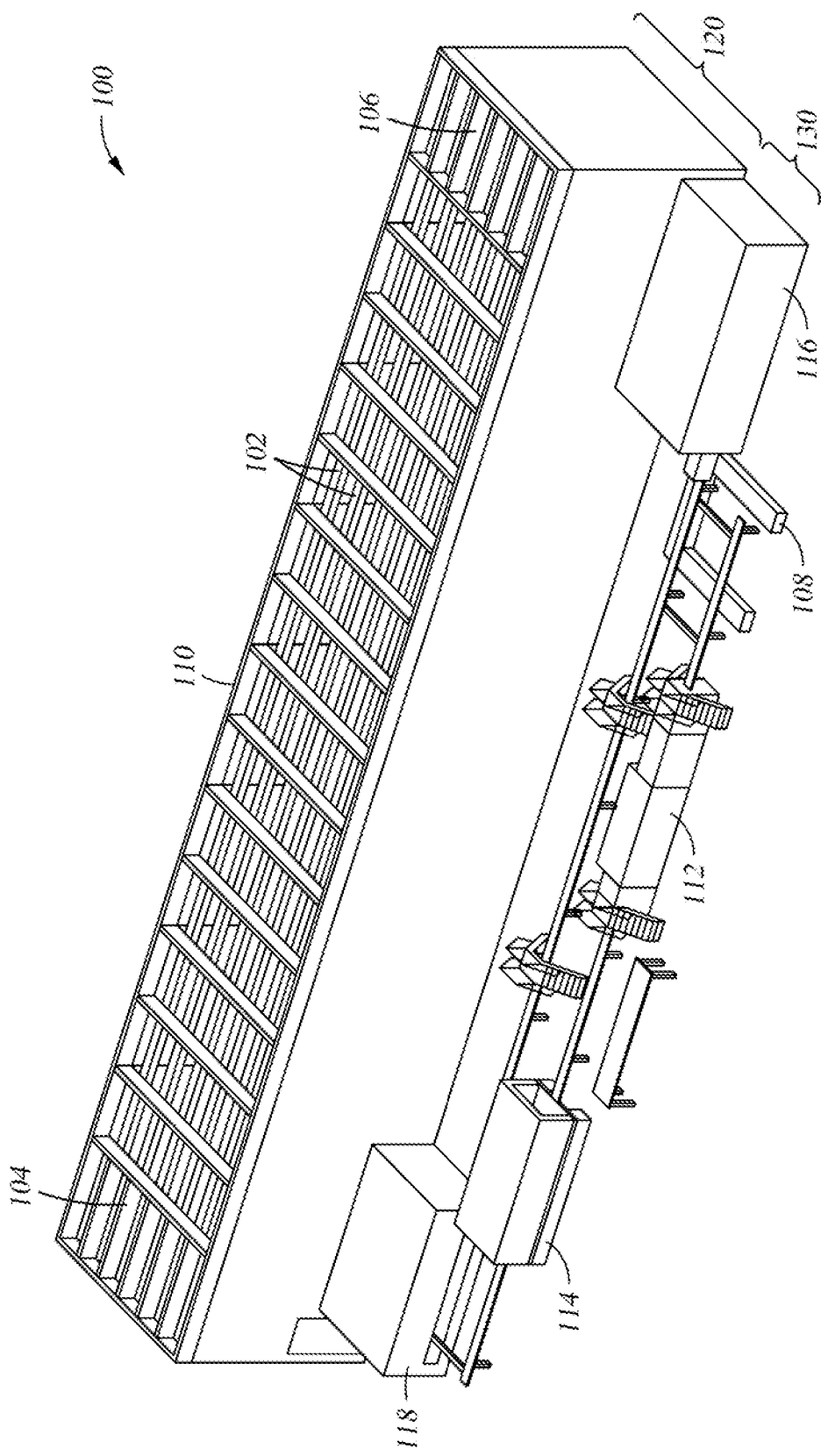
FIG. 1A illustrates a schematic perspective view of a controlled environment agriculture system according to an embodiment of the disclosure.

FIG. 1A illustrates a schematic perspective view of a controlled environment agriculture system 100. The system 100 is configured for high-density growth and crop yield and includes an environmentally controlled growing chamber 120 and a vertical tower conveyance system 110 disposed within the growing chamber 120. The conveyance system 110 is operable to convey grow towers 150, described in greater detail with respect to FIG. 1B, with crops/plants therein through the growing chamber 120. The crops or plants grown within the system 100 exhibit gravitropic, geotropic, and/or phototropic growth characteristics. The crops or plants vary considerably and include, but are not limited to, leaf vegetables, fruiting vegetables, flowering crops, fruits, and tubers, among others. The system 100 is configured to grow a single crop or plant type at a time or grow multiple crop or plant types concurrently.

The system 100 also includes additional conveyance systems, such as a central processing system 130, for moving the grow towers in a circuit or pathway within the system 100 throughout the crop or plant growth cycle. The central processing system 130 includes one or more conveyance mechanisms for directing grow towers to stations for loading plant plugs into, and harvesting crops from, the grow towers. For example, the central processing system 130 includes a harvester station 108, a washing station, 112, and a transplanter station 114. The harvester station 108 removes crops from the grow towers and deposits harvested crops into food-safe containers which are then conveyed to post-harvest facilities (e.g. preparation, washing, packaging, storage, etc.).

In the illustrated embodiment, various stations of the central processing system 130 operate on grow towers disposed in a horizontal orientation. A pick-up station 118, and associated control logic, includes a robot operable to releasably grasp a grow tower oriented horizontally from a loading location, rotate the grow tower into a vertical orientation, and attach the grow tower to a transfer station for insertion into a selected grow line 102 of the growing chamber 120. At the other end of the growing chamber 120, a laydown station 116, and associated control logic, is operable to releasably grasp and move a vertically oriented grow tower from a buffer region, rotate the grow tower to a horizontal orientation, and position the grow tower on a conveyance system for loading into the harvester station 108. The stations 118, 116 each include a robotic arm, such as a six-degree of freedom robotic arm with end effectors for grasping the grow towers.

The growing chamber 120 also includes automated loading and unloading mechanisms for inserting grow towers into selected grow lines 102 and unloading grow towers from the grow lines 102. In one implementation, a load transfer conveyance mechanism 104 includes a powered and free conveyor system that conveys carriages loaded with grow towers from the pick-up station 118 to a selected grow line 102. The load transfer conveyance mechanism 104 also includes one or more actuators that push the grow towers onto a grow line 102. Similarly, an unload transfer conveyance mechanism 106 includes one or more actuators that push or pull the grow towers from the grow lines 102 into a carriage of another powered or free conveyor mechanism, which conveys the carriages from the grow line 102 to the laydown station 116.

The circuit or pathway includes a staging area for loading the grow towers into and out of the conveyance system 110. The conveyance system 110 within the growing chamber 120 is configured to suspend or otherwise support and translate one or more grow towers along a plurality of grow lines 102. Each grow tower is configured to contain plant growth media that supports a root structure of at least one crop or plant growing therein. The grow towers releasably attach to the grow lines 102 in a substantially vertical orientation and move along the grow lines 102 during a growth phase of the plant. The conveyance system 110 and central processing system 130 are arranged in a production circuit under the control of one or more computing and/or control systems.

The growing chamber 120 includes light emitting sources positioned at various locations along and between the grow lines 102 of the conveyance system 110. The light emitting sources can be positioned laterally relative to the grow towers in the grow lines 102 and configured to emit light toward faces of the grow towers that include openings from which the plants grow. In one example, the light emitting sources are light emitting diodes (LED). The light emitting sources are a plurality of LEDs arranged in a bar-like structure which is positioned in a vertical orientation to emit light laterally along an entire length of the grow tower. Multiple LED light bar structures are arranged in the growing chamber 120 along and between the grow lines 102. Other lighting configurations are also contemplated. For example, the LED light bar structures may be arranged horizontally between the grow lines 102. In certain embodiments, the LED light bar structures are water-cooled.

The growing chamber 120 also includes a nutrient supply system configured to supply an aqueous crop nutrient solution to the crops disposed in the grow towers as the grow towers translate through the growing chamber 120. As discussed in greater detail hereinafter, the nutrient supply system provides an aqueous crop nutrient solution to a top of the grow towers and gravity causes the nutrient solution to travel down the vertically-oriented grow towers to the crops disposed along a length of the grow towers.

The growing chamber 120 also includes an airflow source which is configured to direct airflow in a direction lateral to growth of the crops and through an under-canopy of each plant to disturb a boundary layer of the under-canopy of the plant. In another implementation, airflow is directed from the top of the canopy or orthogonal to the direction of plant growth. The growing chamber 120 also includes a control system and associated sensors for regulating at least one growing condition, such as air temperature, airflow velocity, relative air humidity, and ambient carbon dioxide gas content. The control system further includes sub-systems such as HVAC units, chillers, fans, and associated ducting and air handling apparatus.

The grow towers include various identifying attributes, such as bar codes or radio frequency identification (RFID) tags, to enable sensing and location detection of each grow tower. The system 100 includes corresponding sensors and programming logic for tracking the grow towers during various stages of the crop production cycle and for controlling one or more conditions of the growth environment. The operation of the controls systems and the length of time the grow towers remain in the growth environment can vary depending on a variety of factors, such as crop type, desired crop maturity, and the like.

In operation, grow towers, with newly transplanted crops or seedlings disposed therein, are transferred from the central processing system 130 into the conveyance system 110. The conveyance system 110 moves the grow towers to predefined positions along respective grow lines 102 within the growing chamber 120 in a controlled manner. Within the growing chamber 120, the crops disposed in the grow towers are exposed to the controlled conditions of the growth environments, such as light, temperature, humidity, airflow, nutrient supply, etc. The control systems of the controlled environment agriculture system 100 are capable of automated adjustments to the growth environment to improve growing conditions and improve various crop attributes, such as crop yields, crop visual appeal, and crop nutrient content. When the crops are ready for harvesting, the grow towers are transferred from the conveyance system 110 to the central processing system 130 for harvesting and other processing operations.

Figure 1B:
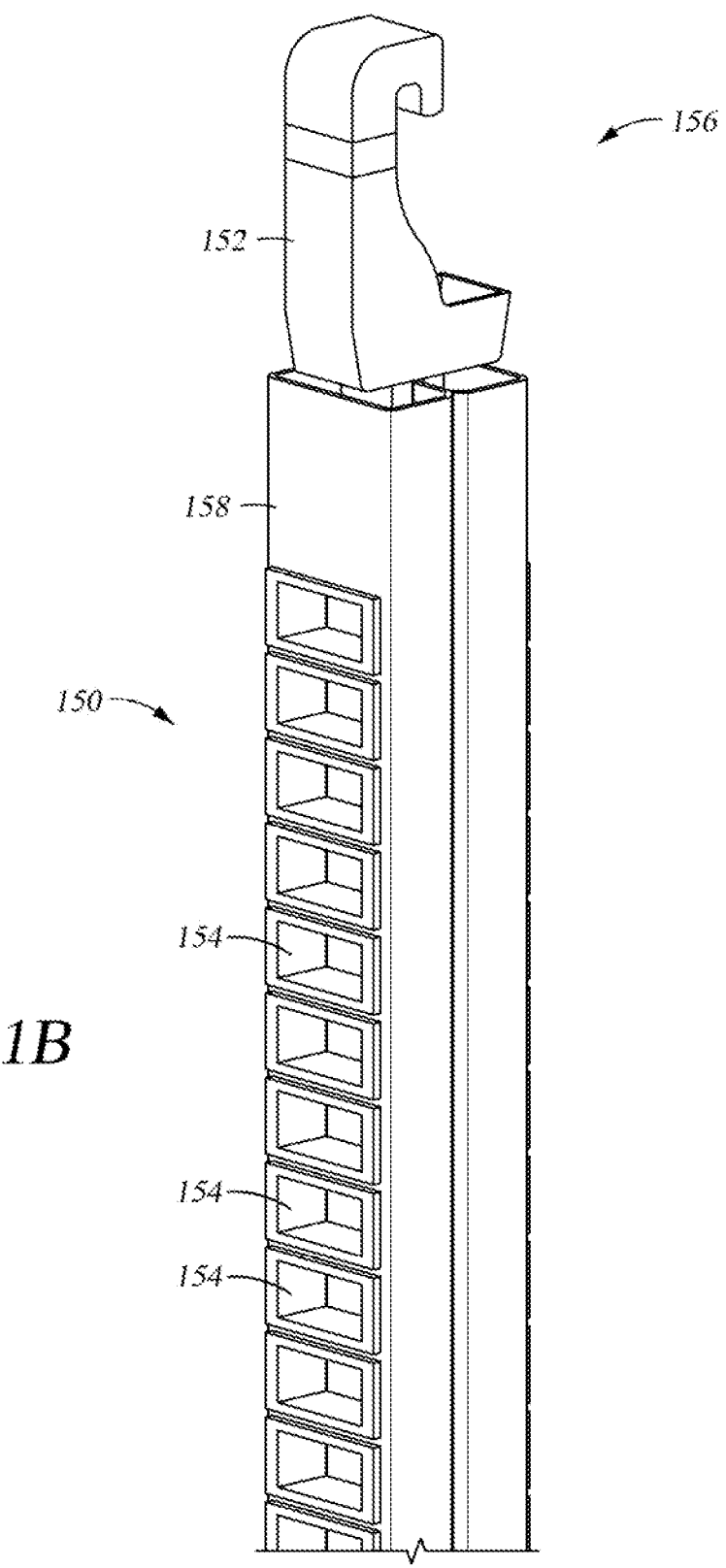
FIG. 1B illustrates a perspective view of a grow tower according to an embodiment of the disclosure.

FIG. 1B illustrates a perspective view of a grow tower 150 according to an embodiment of the disclosure. The grow tower 150 includes sites for individual plants to grow within the system 100. As illustrated, a hook 152 is coupled to and end 156 of the grow tower 150. In one embodiment, the hook 152 is coupled to a top of the grow tower 150 when the end 156 is oriented vertically. The hook 152 enables the grow tower 150 to be supported by the grow lines 102 when the grow tower 150 is inserted into the conveyance system 110. The grow tower 150 has a substantially quadrilateral profile, such as rectangular or square, and a length of the grow tower 150 is greater than about 3 meters, such as between about 5 meters and about 15 meters.

The grow tower 150 includes a plurality of grow sites 154 distributed along a face 158 of the grow tower 150. Although not illustrated, it is contemplated that grow sites 154 may also be distributed along faces of the grow tower 150 other than the face 158. In operation, the transplanter station 114 transplants seedlings into empty grow sites 154 of the grow towers 150 where the seedlings remain and mature until the plant is ready for harvesting.

FIG. 2 illustrates a perspective view of a portion of the grow line 102 with the grow towers 150 according to an embodiment of the disclosure. As illustrated, a plurality of the grow towers 150 are arranged in parallel along the grow line 102. The grow line 102 supports the plurality of grow towers 150 and the grow line 102 is supported by a bracket 202 which is coupled to a superstructure, such as a frame or a facility structure. The hooks 152, which include a load cell 200, couple the grow tower 150 to the grow line 102 and support the grow towers 150 in a vertical orientation as the grow towers 150 are translated along the grow line 102. The load cell 200 enables weight measurement of the grow towers 150. A conveyance mechanism 204 engages the hooks 152 to enable movement of the grow towers 150 along the grow line 102.

Figure 3:
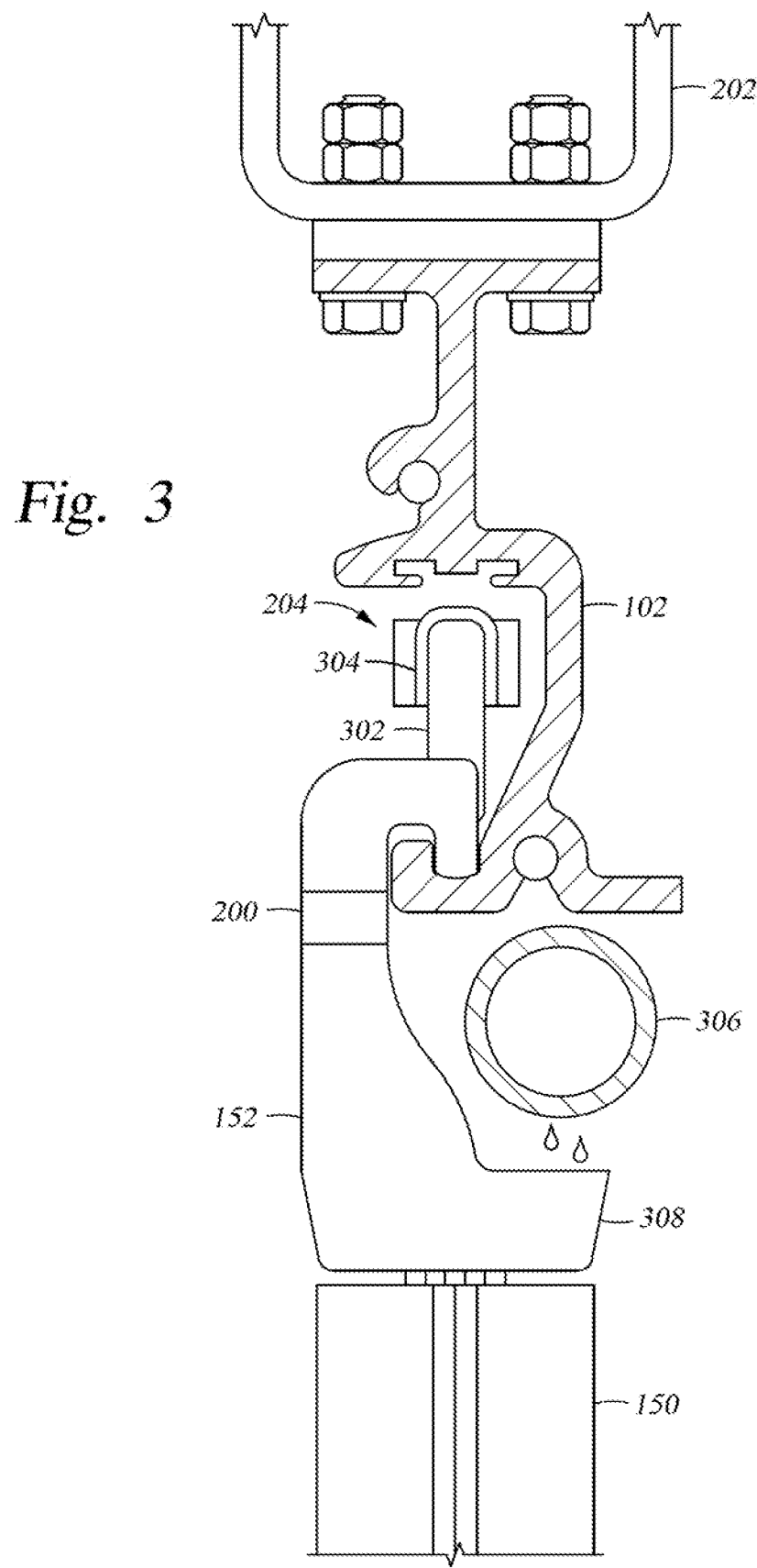
FIG. 3 illustrates a side view of a hook coupled to a grow line according to an embodiment of the disclosure.

FIG. 3 illustrates a side view of the hook 152 coupled to the grow line 102 according to an embodiment of the disclosure. The system 100 utilizes the conveyance mechanism 204 to move the grow towers 150 along the grow line 102. In one example, the conveyance mechanism 204 is a reciprocating cam apparatus. A cam 302 physically pushes the grow towers 150 along the grow line 102. The cam 302 is attached to a cam channel 304 and rotates about one axis. On a forward stroke, rotation is limited by a top of the cam channel 304, causing the cam 302 to push the hook 152, and thus, the grow towers 150 forward. On the reverse or back stroke, the rotation is unconstrained, thus enabling the cam 302 to ratchet over the top of the next hook 152 in sequence along the grow line 102. In operation, the cam 302 strokes a distance forward and backward but the grow towers 150 progress forward along the grow line 102.

An irrigation line 306 is attached to the grow line 102 to supply an aqueous nutrient solution to crops disposed in the grow towers 150 as the grow towers 150 translate through the conveyance system 110. In one embodiment, the irrigation line 306 is a pressurized line with spaced-apart apertures, which includes a nozzle of other fluid distribution apparatus, disposed at expected location of the grow towers 150 as they grow towers 150 advance along the grow line 102 with each movement cycle actuated by the conveyance mechanism 204. For example, the irrigation line 306 has a pipe-like shape and is fabricated from a polymeric material, such as polyvinyl chloride (PVC). In one embodiment, the irrigation line 306 spans the entire length of the grow line 102. Alternatively, multiple irrigation lines 306 may be disposed along a length of the grow line 306. For example, to ensure adequate pressure across the irrigation line 306, a manifold is disposed between sections of the irrigation line 306 to reduce a pressure drop within the irrigation line 306 and achieve a substantially constant flow rate across the length of the irrigation line 306.

The hook 152 include a funnel structure 308 which collects the aqueous nutrient solution from the irrigation line 306 and distributes the aqueous nutrient solution to crops disposed in the grow sites 154 of the grow towers 150. In one embodiment, the funnel structure 308 is formed integrally with the hook 152. A plurality of passageways within the funnel structure 308 distribute the aqueous nutrient solution to the grow sites 154 of the grow towers 150.

Figure 4:
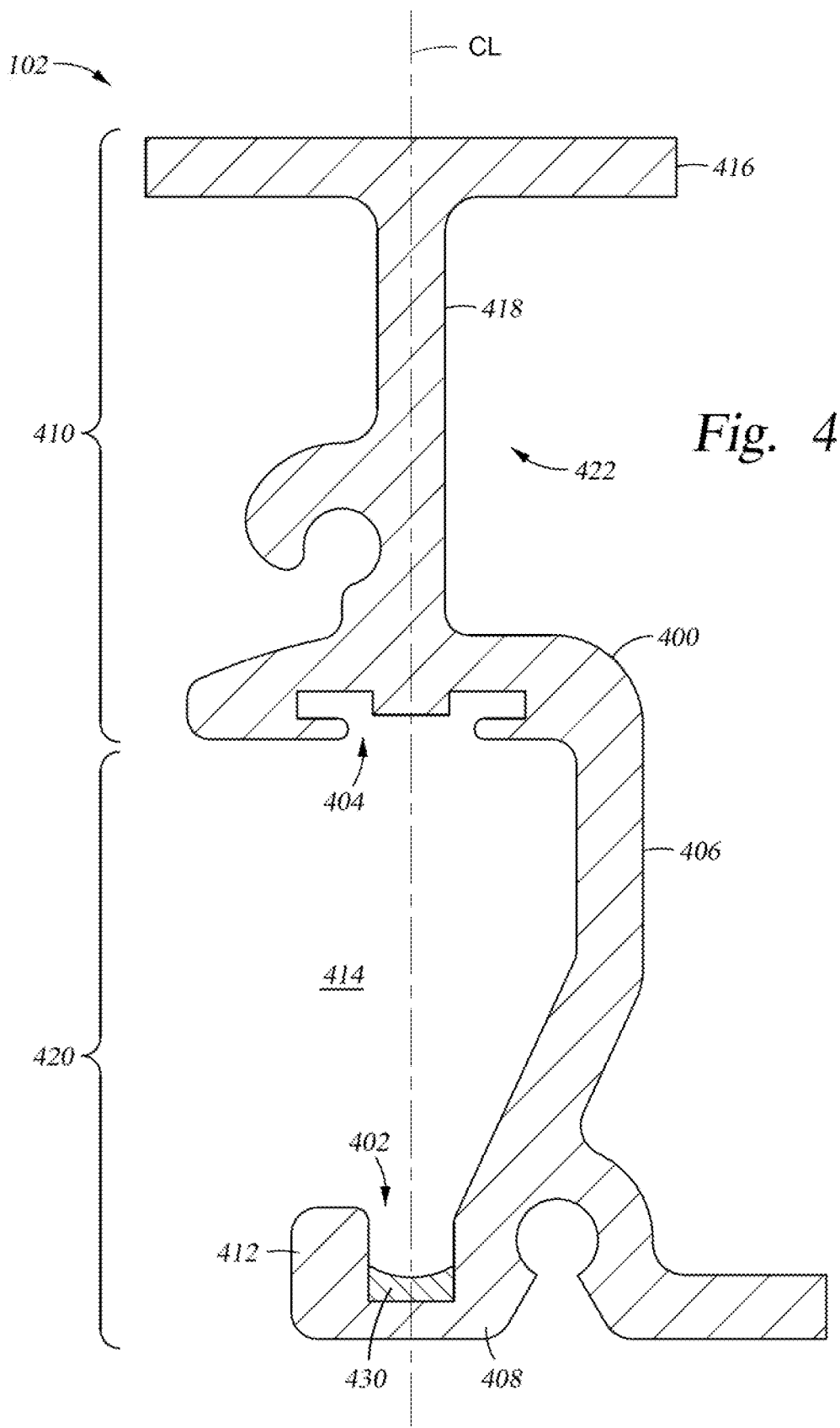
FIG. 4 illustrates a cross-sectional view of a grow line according to an embodiment of the disclosure.

FIG. 4 illustrates a cross-sectional view of the grow line 102 according to an embodiment of the disclosure. In one embodiment, the grow line 102 is fabricated from a metallic material, such as aluminum or the like. The grow line 102 is fabricated by an extrusion process or machined. The grow line 102 includes a body 400 having a first portion 410 and a second portion 420. In one embodiment, the first portion 410 is disposed above the second portion 420 when the grow line 102 is disposed in the conveyance system 110.

The first portion 410 includes a T-shaped extension 422 which includes a first arm 418 and a laterally extending cap 416 coupled to the first arm 418. The cap 416 of the T-shaped extension 422 is coupled to the bracket 202 illustrated in FIG. 2. A downward-facing slot 404 is also formed in the first portion 410 and the conveyance mechanism 204 is coupled to the grow line 102 via the slot 404. The second portion 420 includes a second arm 406 and a base member 408 having a groove 402 formed therein. A lip 412 extends from the base member 408 toward the slot 404 and further defines the groove 402. The second arm 406 extends from a portion of the body 400 radially outward of the slot 404 and extends in a direction opposite of the first arm 422. As illustrated, the second arm 406 extends from an outermost portion of the body 400 and is angled such that the groove 402 of the base member 408 is substantially aligned with the first arm 418 along a centerline CL. The second arm 406 is oriented such that an opening 414 is defined by the second arm 406 and base member 408, the lip 412, and at least a portion of the first portion 410 that includes the slot 404. The opening 414 is sized to receive the hook 152 therein when the grow towers 150 are loaded onto the grow line 102.

In one embodiment, the grow line 102 includes a load cell 430 disposed in the groove 402 of the base member 408. A plurality of load cells 430 are disposed along a length of the grow line 102. In one example, a plurality of load cells 430 is positioned along the grow line 102 with a spacing between adjacent load cells 430 of about 3 meters or less, such as about 1 meter or less. The load cells 430 are discretely positioned along the grow line 102 to provide measurement sites of the grow towers 150 as the grow towers 150 traverse the grow line 102. In another embodiment, the load cells 430 are integrated or otherwise disposed in the lip 412. In this embodiment, the hook 152 rests on the lip 412 and the load cells 430 can detect force applied to the lip 412.

In operation, the grow towers 150, which are coupled to the grow line 102 via the hook 152, exert force on the hook 152 as the hook rides along and within the groove 402 of the grow line 102. When the hook 152 is positioned on the load cell 430, the load cell 430 captures a load applied to the load cell 430 and is capable of determining the weight of the grow towers 150. The load cells 430 may be considered a force transducer in that force, such as tension, compression, pressure, or torque applied to the load cell 430 is detected and translated, modulated, or otherwise formed into an electrical signal that can be measured. As force applied to the load cell 430 increases, the electrical signal changes proportionally, thus enabling measurement of the force, or weight, applied to the load cell 430. In one embodiment, the load cell 430 is a compression type load cell. Examples of compression type load cells include, but are not limited to, pancake type load cell, a canister type load cell, and an S-type load cell, among others.

The load cell 430 may also be a hydraulic, pneumatic, piezoelectric, or strain gauge type load cell. In one embodiment, the load cell 430 includes a strain gauge. In this embodiment, the load cell 430 includes a metallic body which exhibits minimal elasticity which can be considered a spring element. As force is exerted on the metallic body, the spring element of the body is deformed. A strain gauge, which may be a wire or foil, typically coupled to the body by a flexible backing material, either elongates, compresses, or otherwise deforms in response to deformation of the spring element. In one embodiment, the strain gauge is a wheatstone bridge or the like. The strain gauge measures changes in the force via a change in electrical resistance which can then be standardized as a weight, for example, a weight of the grow towers 150.

Figure 5:
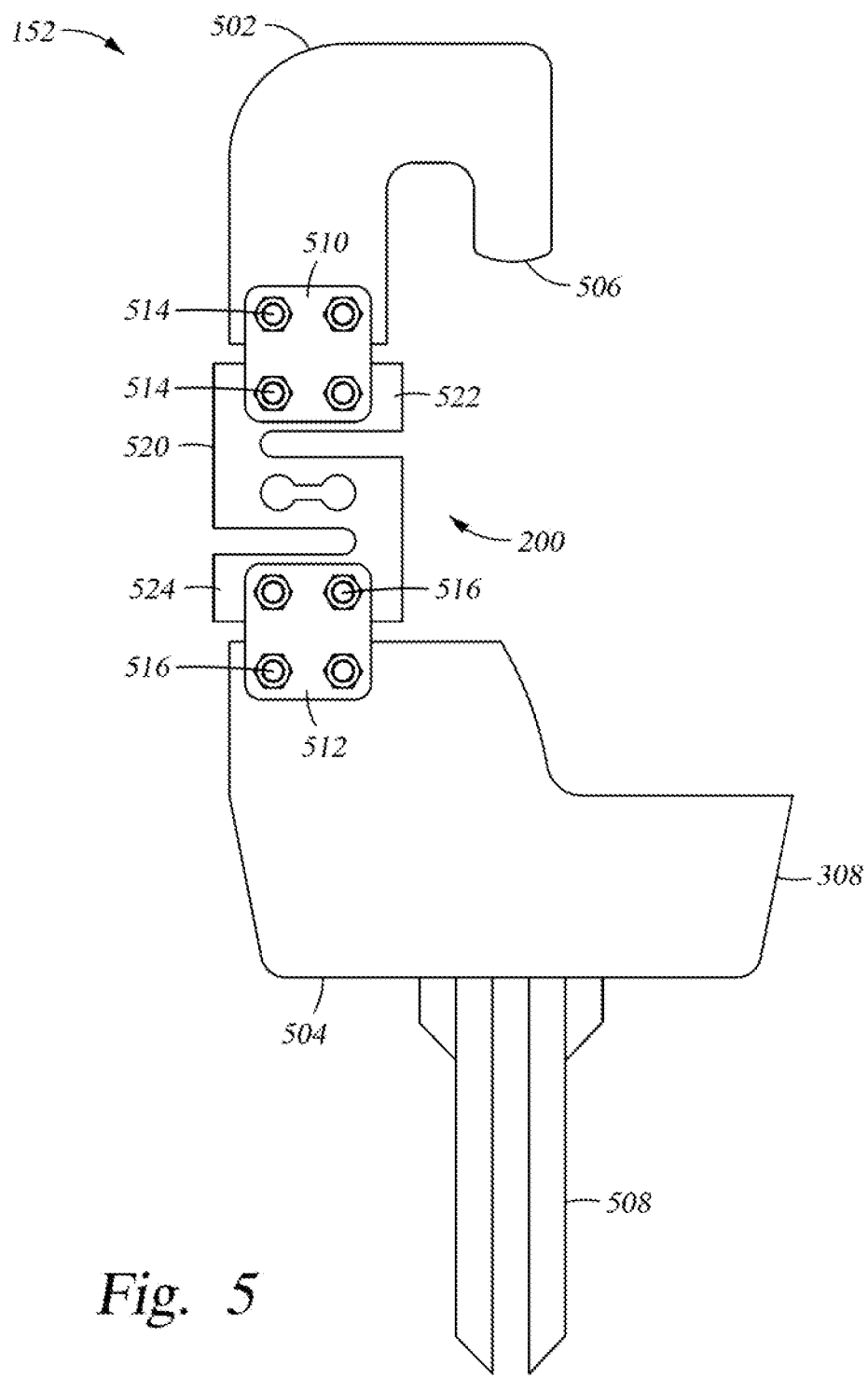
FIG. 5 illustrates a side view of a hook with a load cell according to an embodiment of the disclosure.

FIG. 5 illustrates a side view of the hook 150 with the load cell 200 according to an embodiment of the disclosure. The hook 152 includes a first portion 502 and a second portion 504 coupled to the load cell 200. In the illustrated embodiment, the load cell 200 is an S-type tension load cell which includes a strain gauge or the like for measuring weight. In other embodiments, the load cell 200 is a tension link type load cell, a canister type tension load cell, or a pancake type tension load cell. The load cell 200 includes a body 520 which includes a first arm 522 and a second arm 524 extending therefrom. The first arm 522 and the second arm 524 are oriented opposite one another and couple to the first portion 502 and the second portion 504 of the hook 152, respectively. A first bracket 510 couples the first arm 522 to the first portion 502 of the hook 152 via a plurality of fasteners 514. Similarly, a second bracket 512 couples the second arm 524 to the second portion 504 of the hook 152 via a plurality of fasteners 516. The fasteners 514, 516 may be bolts, screws, or other suitable fastening apparatus.

The first portion 502 of the hook 152 further includes a groove-engaging member 506. In operation, the groove-engaging member 506 is disposed within the groove 402 of the grow lien 102 illustrated in FIG. 4. The groove-engaging member 506 is an extension of the first portion 502 sized to fit within and traverse along the groove 402. In one embodiment, the groove-engaging member 506, or at least the portion of the groove-engaging member 506 which contacts the groove 402, is coated with a material having a low coefficient of friction. For example, the groove-engaging member 506 is coated with polytetrafluoroethylene or the like.

The second portion 504 of the hook 152 includes a flange 508 which extends from the second portion 504 below the funnel structure 308. Outlets and passageways (not shown) of the funnel structure 308 are oriented substantially adjacent to and at opposing sides of the flange 508. The flange 508 registers with the grow tower 150 to substantially center the hook 152 and provide additional sites to couple or otherwise attach the hook 152 to the grow tower 150.

Figure 6:
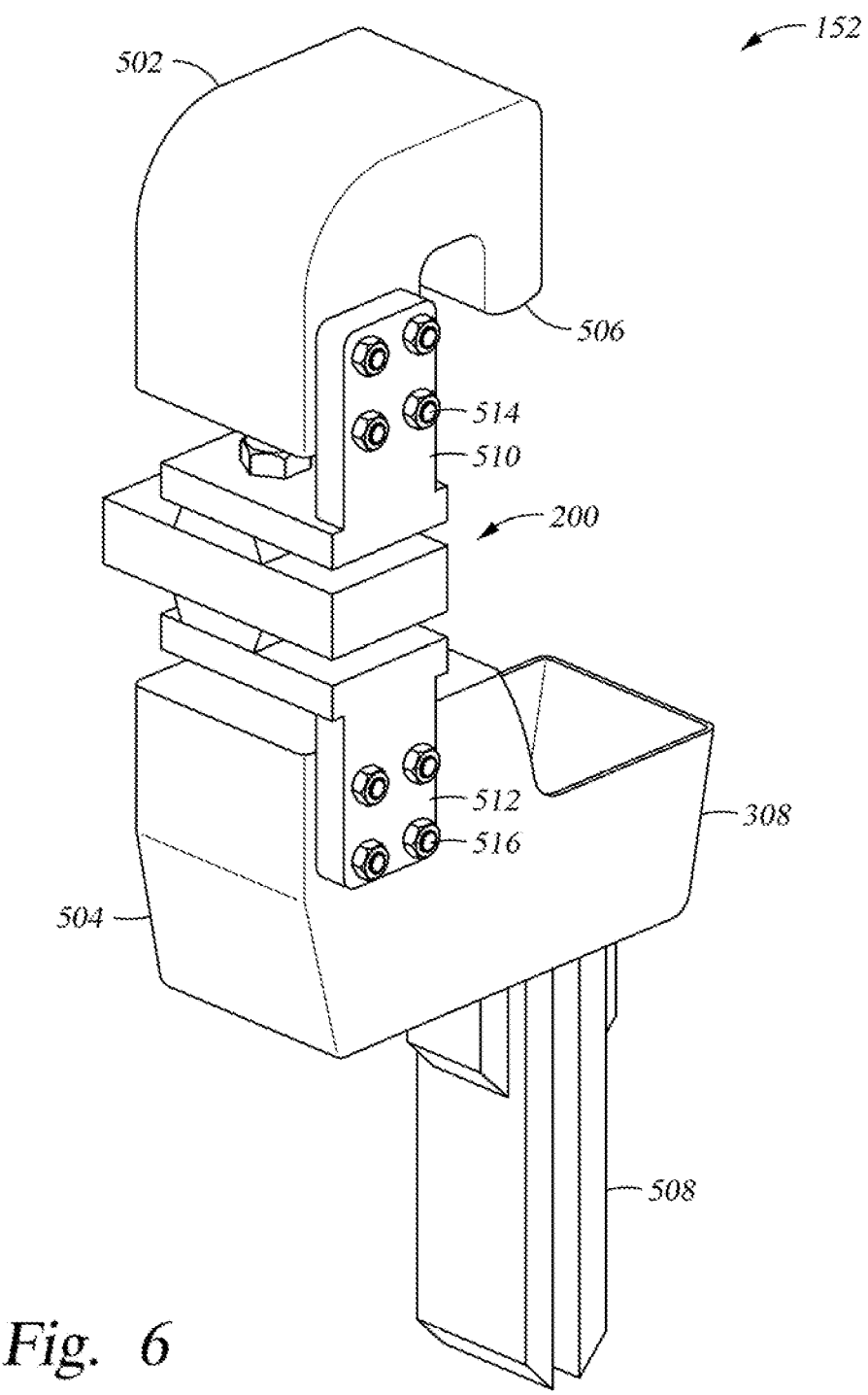
FIG. 6 illustrates a perspective view of a hook with a load cell according to an embodiment of the disclosure.

FIG. 6 illustrates a perspective view of the hook 152 with the load cell 200 according to an embodiment of the disclosure. The hook 152 and load cell 200 of FIG. 6 are similar to the hook 152 of FIG. 5 but the load cell 200 of FIG. 6 is a canister, pancake, or tension link type tension load cell instead of an S-type load cell. Thus, it is contemplated that different types of load cells may be implemented within the hook 152 to provide for weight measurement of grow towers 150 suspended and supported by the hook 152 on the grow line 102.

Figure 7:
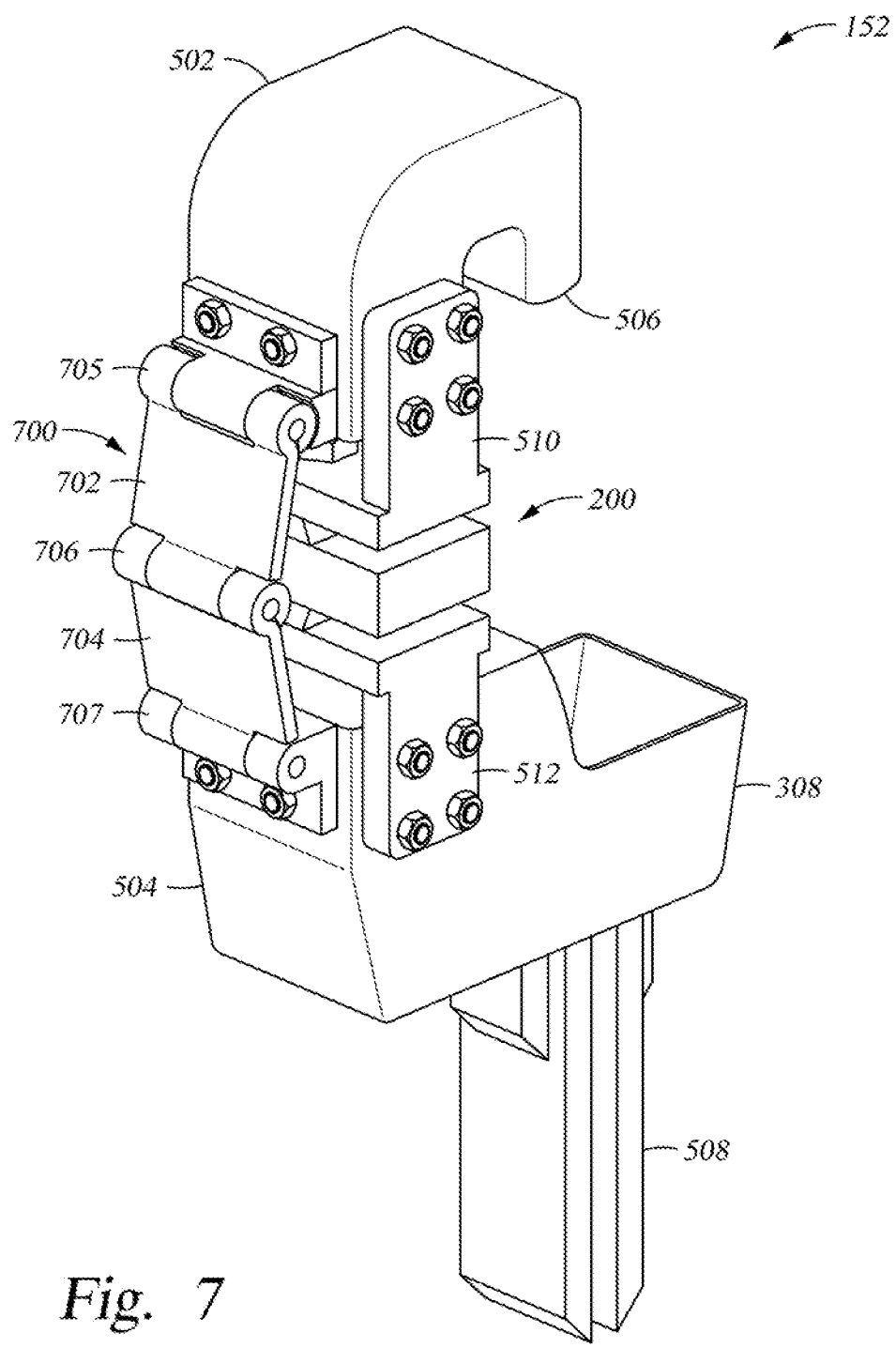
FIG. 7 illustrates a side view of a hook with a load cell of FIG. 6 with a torsion reduction member according to an embodiment of the disclosure.

FIG. 7 illustrates a side view of the hook 152 with the load cell 200 of FIG. 6 with a torsion reduction member 700 according to embodiments of the disclosure. In operation, the load cell 200 is configured to measure a weight of a grow tower 150 coupled to the hook 152 which couples the grow tower 150 to the grow line 102. Because the grow towers 150 are suspended by the grow line 102 and translate laterally along the grow line 102, torsional forces are occasionally applied to the hook 152. For example, when the hook 152 is contacted by the conveyance mechanism 104 to translate the grow tower 150 along the grow line 102, and because the grow tower 150 is suspended, the grow tower 150 may swing, rotate, or otherwise move in a manner which induces torsion of the hook 152, and thus the load cell 200. The influence of tension on the load cell 200 can potentially adversely affect the accuracy of the load cell weight measurement of the grow tower 105.

In the illustrated embodiment, the hook 152 includes a torsion reduction member 700. The torsion reduction member 700 includes a first arm 702 and a second arm 704 coupled together by a first hinge 706. The first arm 702 is coupled to the first portion 502 of the hook 152 by a second hinge 705 and the second arm 704 is coupled to the second portion 504 of the hook 152 by a third hinge 707. The hinges 705, 706, 707 enable movement of the first portion 502 and second portion 504 in a direction detectable by the load cell 200 but substantially reduce or prevent torsional or rotational movement of the first portion 502 and second portion 504 relative to one another. The first arm 702 and second arm 704 exhibit any suitable morphology, such as a rod, shaft, plate, or the like. It is also contemplated that the first arm 702 and second arm 704 may be multiple arms, rods, shafts, plates, or the like. In one embodiment, the first arm 702 and the second arm 704 are formed from a polymeric material similar to the material utilized to fabricate the hook 152. Alternatively, the first arm 702 and the second arm 704 are formed from a metallic material.

The hinge 706, which couples the first arm 702 and the second arm 704, enables unidirectional or linear movement of the arms 702, 704 when force is applied to the load cell 200, but prevents or substantially reduces torsional force exerted on the load cell 200. The hinge 706 may be a butt hinge, a barrel hinge, a piano hinge, a pivot hinge, or a spring hinge or the like. By coupling the first portion 502 and the second portion 504 with the torsion reduction member 700, twisting of the hook 152 about the load cell 200 can be reduced or eliminated which enabled improved force measurement by the load cell 200, and thus, weight measurement of the grow towers 150.

Figure 8:
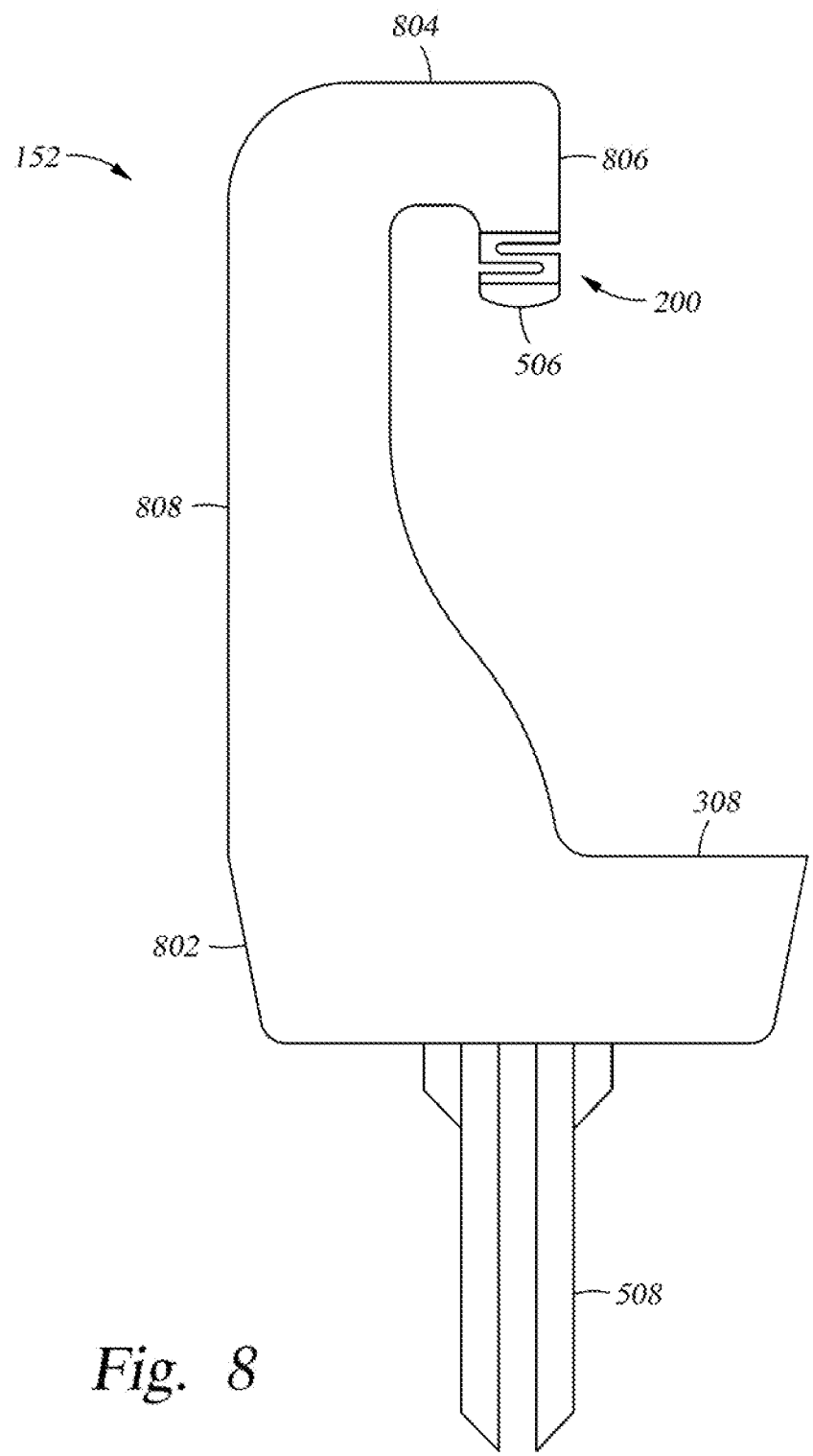
FIG. 8 illustrates a side view of a hook with a load cell according to an embodiment of the disclosure.

FIG. 8 illustrates a side view of the hook 152 with the load cell 200 according to an embodiment of the disclosure. The hook 152 includes a unitary body 802, the groove-engaging member 506, and the load cell 200 disposed between the body 802 and the groove-engaging member 506. A first extension 808 of the body 802 extends opposite the flange 508 and a second extension 804 of the body extends laterally from the first extension 808. The second extension 804 extends from the first extension and terminates at a tip 806. The tip 806 is positioned laterally inward from the first extension 808 and the tip 806 is substantially vertically aligned with the flange 508.

The load cell 200 is coupled to and positioned below the tip 806. The groove-engaging member 506 is coupled to the load cell 200 such that the groove-engaging member 506, the load cell 200, and tip 806 are substantially vertically aligned. In one embodiment, the load cell 200 is a compression type load cell. For example, the load cell 200 may be a pancake type load cell, a canister type load cell, and an S-type load cell, among others. In operation, the load cell 200, when the groove-engaging member 506 is disposed in the groove 402 of the grow line 102, detects compression force applied to the load cell 200.

FIG. 9A illustrates a side view of a grow tower weight measurement system 901 according to an embodiment of the disclosure. In operation, it may be desirable to measure the weight of a single grow tower 150 when the grow tower 150 is not disposed within the conveyance system 110. In the illustrated embodiment, a stationary, or non-conveyed grow tower 150, is coupled to a structural member such as the bracket 202. The bracket 202 is any suitable structural member capable of supporting the weight of the grow tower 150.

The grow tower 150 has a first end 902, which corresponds to the end 156 illustrated in FIG. 1B, and a second end 904 opposite the first end 902. In one embodiment, the first end 902 is a top end of the grow tower 150 and the second end 904 is the bottom end of the grow tower 150. The load cell 200 is disposed between a plurality of connecting members 906, 908. In one embodiment, the load cell 200 is a tension type load cell, such as, but not limited to, an S-type tension load cell, a tension link type load cell, a canister type load cell, or a pancake type load cell. The load cell 200 of the illustrated embodiment, like other embodiments described herein, may include a strain gauge or the like for measuring force applied to the load cell 200.

A first connecting member 908 is disposed between the bracket 202 and the load cell 200 and a second connecting member 906 is disposed between the load cell 200 and the first end 902 of the grow tower 150. The connecting members 906, 908 are any suitable structural member suitable for coupling the grow tower 150 to the load cell 200 and the load cell 200 to the bracket 202. For example, the connecting members 906, 908 may be cables, rods, shafts, or other suitable apparatus. Thus, the force (weight) of the grow tower 150 is applied to the load cell 200 and the load cell 200 can be utilized to measure the weight of the grow tower 150.

FIG. 9B illustrates an end side view of a grow tower weight measurement system 903 according to an embodiment of the disclosure. In the illustrated embodiment, the load cell 200 is coupled to the second end 904 of the grow tower 150. The load cell 200 is a compression type load cell. For example, the load cell 200 may include, but is not limited to, pancake type load cells, a canister type load cells, and S-type load cells, among others. In this embodiment, the weight of the grow tower 150 is measured when the grow tower 150 is stationary or when the grow tower 150 is disposed within the conveyance system 110. In embodiments where the grow tower 150 is stationary, the load cell 200 supports the weight of the grow tower 150 and measures the force applied thereto.

In embodiments where the grow tower 150 is disposed in the conveyance system 110, the load cell 200 is coupled to one or more wheels 912 by an axle 910. As the grow tower 150 translates along the grow line 102, the weight of the grow tower 150 is supported by the assembly of wheels 912 and the axle 910. Because the axle extends through, supports, or is otherwise coupled to the load cell 200, the grow tower 150 may translate along the grow line 102 while being weighed by the load cell 200 via a compression of the load cell 200. A guide member 918 is coupled to the first end 902 and extend therefrom. In one embodiment, the guide member 918 is similar to the hook 152. However, the guide member 918 does not suspend or otherwise support the weight of the grow tower 150 on the grow line 102. Rather, the guide member 918 functions to guide or align the grow tower 150 as the grow tower 150 translates along the grow line 102 while the load cell 200 and the wheel and axle assembly 912/910 supports the weight of the grow tower 150, thus enabling the load cell 200 to measure the force applied thereto. In another embodiment, the guide member 918 is a trolley or other suitable apparatus configured to guide the grow tower 150 along the grow line 102.

FIG. 9C illustrates a side view of a grow tower weight measurement system 905 according to an embodiment of the disclosure. A load cell 200, which is a beam-type load cell in the illustrated embodiment, is coupled to the second end 904 of the grow tower 150. The beam-type load cell may be a bending beam load cell, a shear beam load cell, or other suitable beam-type load cell. The beam-type load cell may include one or more strain gauges. In embodiments utilizing a plurality of strain gauges, the strain gauges measure tension and/or compression forces applied to the load cell 200.

In one embodiment, a length of the load cell 200 is greater than a width of the grow tower 150. For example, in the illustrated embodiment, the grow tower 150 is coupled to the load cell 200 at a first end 914 of the load cell 200. Because a width of the grow tower 150 is less than a length of the load cell 200, a second end 916 of the load cell is disposed apart from a region of the load cell 200 where the grow tower 150 is coupled.

A carriage assembly 920 is coupled to and supports the load cell 200 thereon. The carriage assembly 920 includes a frame 924 which includes an extension 922 that couples to the second end 916 of the load cell 200. Thus, the load cell 200 is supported at the second end 916 but is substantially free of support immediately beneath the grow tower 150 to enable force measurement by the beam-type load cell 200. The axles 910 extend through the frame 924 and couple the wheels 912 to the frame 924. The extension 922, which is a unitary structure with the frame 924 or a separate structure coupled to the frame 924, extends in an orientation substantially normal to a major axis of the frame 924. The extension 922 is disposed on the frame 924 between the axles 910.

One or more of the guide members 918 are coupled to the first end 902 of the grow tower 150 and the guide members 918 interface with the grow line 102. Similar to the guide member 918 described with regard to FIG. 9B, the guide members 918 of FIG. 9C do not support the weight of the grow tower 150, rather, the guide members 918 maintain a position the grow tower 150 relative to the grow line 102 while the load cell 200, and by extension, the carriage assembly 920, support the weight of the grow tower 150. As such, a beam-type load cell 200 is utilized to measure the weight of the grow tower 150 without adding complexity support integration of the grow tower 150 with the grow line 120.

FIG. 9D illustrates a side view of a grow tower weight measurement system 907 according to an embodiment of the disclosure. Similar to FIG. 9C, the embodiment illustrated in FIG. 9D utilizes a beam-type load cell 200 and a carriage assembly 920 to support the grow tower 150 for weight measurement. However, the carriage assembly 920 and the load cell 200 are coupled to the first end 902 of the grow tower 150. The beam-type load cell 200 may be a bending beam load cell, a shear beam load cell, or other suitable beam-type load cell. The beam-type load cell may include one or more strain gauges. In embodiments utilizing a plurality of strain gauges, the strain gauges may measure tension and/or compression forces applied to the load cell 200.

In one embodiment, a length of the load cell 200 is greater than a width of the grow tower 150. For example, in the illustrated embodiment, the grow tower 150 is coupled to the load cell 200 at the first end 914 of the load cell 200. Because a width of the grow tower 150 is less than a length of the load cell 200, the second end 916 of the load cell is disposed apart from a region of the load cell 200 where the grow tower 150 is coupled.

The carriage assembly 920 is coupled to and supports the load cell 200 thereon. The carriage assembly 920 includes the frame 924 which includes the extension 922 that couples to the second end 916 of the load cell 200. Thus, the load cell 200 is supported at the second end 916 but is substantially free of support immediately above the grow tower 150 to enable force measurement by the beam-type load cell 200. The axles 910 extend through the frame 924 and couple the wheels 912 to the frame 924. The extension 922, which is a unitary structure with the frame 924 or a separate structure coupled to the frame 924, extends in an orientation substantially normal to a major axis of the frame 924. The extension 922 is disposed on the frame 924 between the axles 910.

The carriage assembly 920 is utilized to translate the grow tower 150 along the grow line 102. For example, the wheels 912 of the carriage assembly 920 are sized to fit within the groove 402 of the grow line 102. In addition to extending normal to the major axis of the frame 924, the extension 922 may also extend laterally from the frame 924 to enable the extension 922 to extend beyond the lip 412 of the grow line 102 such that the load cell 200 and grow tower 150 don't interfere with the grow line 102. The extension 922 may also extend a length sufficient for the load cell 200 to be positioned below the grow line 102. By translating along the grow line 102 via the carriage assembly 920, the beam-type load cell 200 is utilized to measure the weight of the grow tower 150 utilizing the grow line 102 which accommodates other grow tower coupling mechanisms such as hooks 152 described herein.

FIG. 10A illustrates a side view of a grow line weight measurement system according to an embodiment of the disclosure. While weight measurement of individual grow towers 150 enables collection and analysis of growth characteristics on a per tower basis, it is also advantageous to measure the entire grow line 102 to obtain additional plant growth characteristics. For example, measurements obtained from the entire grow line 102 can be utilized or compared to measurement characteristics of individual grow towers 150 and utilized to obtain additional growth characteristics of plants or crops in the grow towers 150. The system of FIG. 10A includes a plurality of load cells 1020, 1022 which are configured to measure the weight of the entire grow line 102 with grow towers 150 disposed thereon. The grow line 102 generally includes a first end 1002 and a second end 1004 disposed opposite the first end 1002. The first end 1002 corresponds to an end of the grow line 102 where the grow towers 150 enter the conveyance system 110 and the second end 1004 corresponds to an end of the grow line 102 where the grow towers 150 exit the conveyance system 110.

A top 1006 of the grow line 102 and a bottom 1008 of the grow line 102 are parallel to one another. The load cells 1020, 1022, which are tension type load cells such as those described herein, are coupled between the top 1006 of the grow line 102 and a frame structure 1024, 1026. In one embodiment, the load cells 1020, 1022 are coupled to the grow line 102 adjacent to the ends 1002, 1004, respectively. It is contemplated that additional load cells may be utilized along the length of the grow line 102 in additional to the illustrated load cells 1020, 1022. In one embodiment, the frame structure 1024, 1026, which is a singular structure or individual structures, is a frame which supports the grow line 102. Alternatively, the frame structure 1024, 1026 may be part of a warehouse facility.

FIG. 10B illustrates a side view of a grow line weight measurement system according to an embodiment of the disclosure. The system of FIG. 10B is similar to the system described with regard to FIG. 10A, however, compression type load cells 1030, 1032 are utilized instead of tension type load cells. The load cells 1030, 1032 are disposed between frame structures 1034, 1036 and the bottom 1008 of the grow line 102. Thus, force exerted on the load cells 1030, 1032 includes the weight of the grow line 102 and the grow towers 150 which compresses the load cells 1030, 1032 between the bottom 1008 of the grow line 102 and the frame structures 1034, 1036.

FIG. 10C illustrates a side view of a grow line weight measurement system according to an embodiment of the disclosure. The system of FIG. 10C utilizes a plurality of beam-type load cells disposed at opposite ends 1002, 1004 of the grow line 102. A first beam-type load cell 1040 is coupled between a first frame structure 1044 and the bottom 1008 of the grow line 102 adjacent to the first end 1002 of the grow line 102. A second beam-type load cell 1042 is coupled between a second frame structure 1046 and the top 1006 of the grow line 102 adjacent to the second end 1004 of the grow line 102. The first beam-type load cell 1040 measures a downward force applied thereon by the bottom 1008 of the grow line 102 and the second beam-type load cell 1042 measures an upward force applied thereon by the top 1006 of the grow line 102. Together, the load cells 1040, 1042 measure their respective deflection and generate a signal which is translated into or correlated with a weight measurement.

Load cells are utilized to measure individual grow tower weights and entire system weights to provide for the collection of data corresponding to plant growth characteristics. Load cell measurement of individual grow towers or entire grow lines enables evaluation of plant growth via tower or line weight and water flow within grow towers or if potential blockages have occurred. Moreover, known weights associated with plant growth or irrigation processes are utilized to generate a profile and then compare the profile with real time results during a plant growth cycle. For example, a grow tower weight pre-irrigation may be determined, irrigation of the plants within the tower is performed, and the load cells are utilized to collect the weight of the grow tower post-irrigation. If the weight of the grow tower post-irrigation is within an expected weight compared to the predetermined profile, it can be determined that irrigation is proceeding unimpeded. However, if the weight of the grow tower doesn't increase or is not within an expected profile, an alarm may be signaled to identify that a potential anomaly has occurred.

The load cells also enable realization of diminishing return on plant spacing with the grow towers due to correlation of plant size with weight measurements detected by the load cells. For example, a plant of a certain weight may be correlated with a canopy size of that plant. In grow towers with fixed grow sites, the weight of the grow tower may be utilized to determine a spacing profile between adjacent plants. When a weight measured by a load cell determines that spacing is limited, improved decisions may be enabled with regard to continued growth of the plants or harvesting of the plants.

While the foregoing is directed to embodiments of the present disclosure, other and further embodiments of the disclosure may be devised without departing from the basic scope thereof, and the scope thereof is determined by the claims that follow.

What is claimed is:

1. A grow line apparatus, comprising:
   a body having a first arm extending along a centerline of the body;
   a second arm of the body extending opposite the first arm;
   a base member extending laterally from the second arm and across the centerline of the body;
   a lip extending from the base member toward the first arm,
   wherein the lip, the base member, and the second arm define a groove; and
   a load cell disposed in the groove; and
   a hook, wherein the hook comprises a flange, and a grow tower is coupled to the flange.

2. The apparatus of claim 1, further comprising a cap extending laterally from the first arm.

3. The apparatus of claim 1, further comprising a slot disposed in the body opposite the groove.

4. The apparatus of claim 1, wherein the load cell is a compression-type load cell.

5. The apparatus of claim 1, wherein the hook comprises a groove engaging member, and wherein the groove engaging member is sized to fit within the groove.

6. The apparatus of claim 5, wherein the groove engaging member is adapted to contact the load cell.

7. The apparatus of claim 1, wherein the grow tower comprises a plurality of grow sites.

8. The apparatus of claim 1, wherein the load cell is a hydraulic, pneumatic, piezoelectric, or strain gauge type load cell.

* * * * *